No. 12,028. Reissued Sept. 9, 1902.

D. T. & S. W. CROXTON.

CASTING APPARATUS.

(Application filed May 5, 1902.)

2 Sheets—Sheet 1.

Witnesses
E. R. Alexander
N. Curtis Lammond

David T. Croxton and
Samuel W. Croxton Inventors
by A. H. Bliss
Attorney

No. 12,028. Reissued Sept. 9, 1902.

D. T. & S. W. CROXTON.

CASTING APPARATUS.

(Application filed May 5, 1902.)

2 Sheets—Sheet 2.

Witnesses

E. P. Alexander

N. Curtis Hammond

David T. Croxton and Samuel W. Croxton Inventors by H. H. Bliss

Attorney

UNITED STATES PATENT OFFICE.

DAVID T. CROXTON, OF CANAL DOVER, AND SAMUEL W. CROXTON, OF CLEVELAND, OHIO.

CASTING APPARATUS.

SPECIFICATION forming part of Reissued Letters Patent No. 12,028, dated September 9, 1902.

Original No. 650,372, dated May 29, 1900. Application for reissue filed May 5, 1902. Serial No. 106,996.

*To all whom it may concern:*

Be it known that we, DAVID T. CROXTON, a resident of Canal Dover, county of Tuscarawas, and SAMUEL W. CROXTON, a resident of Cleveland, in the county of Cuyahoga, State of Ohio, citizens of the United States of America, have invented certain new and useful Improvements in Casting Apparatus, of which the following is a specification.

This invention relates to ingot-casting apparatus; and it consists in additional improvements on Patent No. 620,020, dated February 21, 1899, granted to R. W. Davies.

This improvement has for its object to provide a ready and simple means for receiving the ingots from the molds, conveying, cooling, and depositing them onto railway-cars or other suitable receptacles simultaneously with and with the same power that operates the casting part of the apparatus.

The nature and operations of this improvement will fully appear from the subjoined description when considered in connection with the accompanying drawings, in which—

Figure 1:
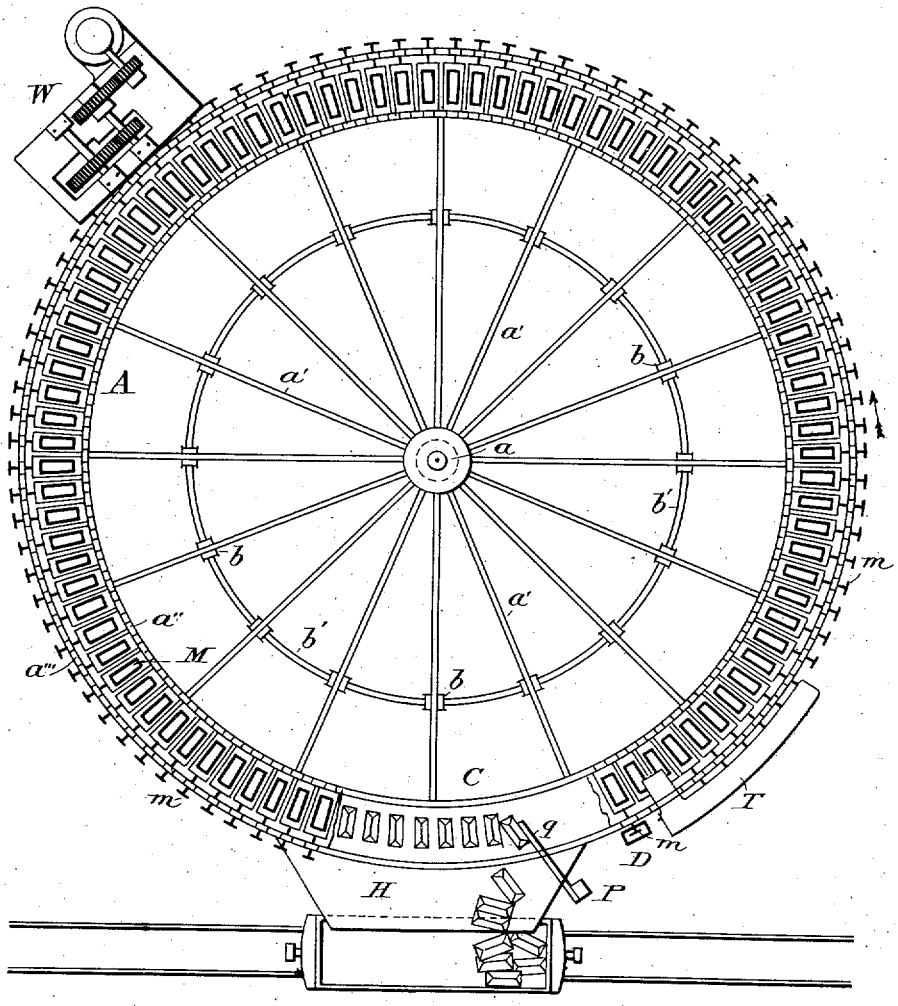
Figure 2:
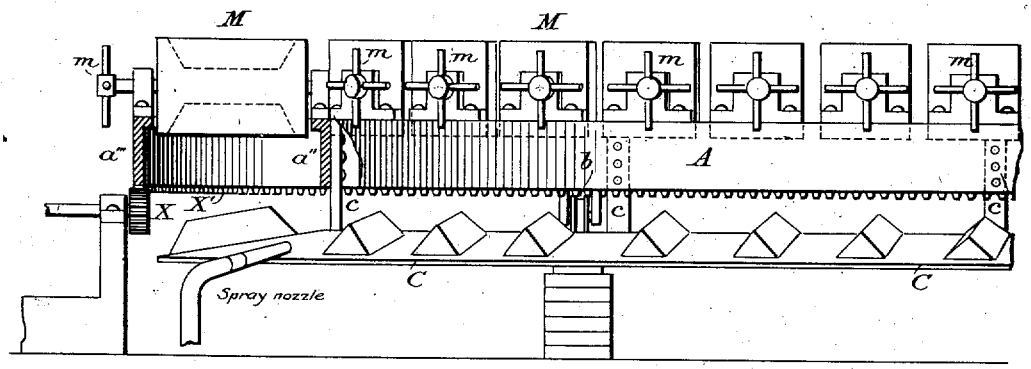
Figure 3:
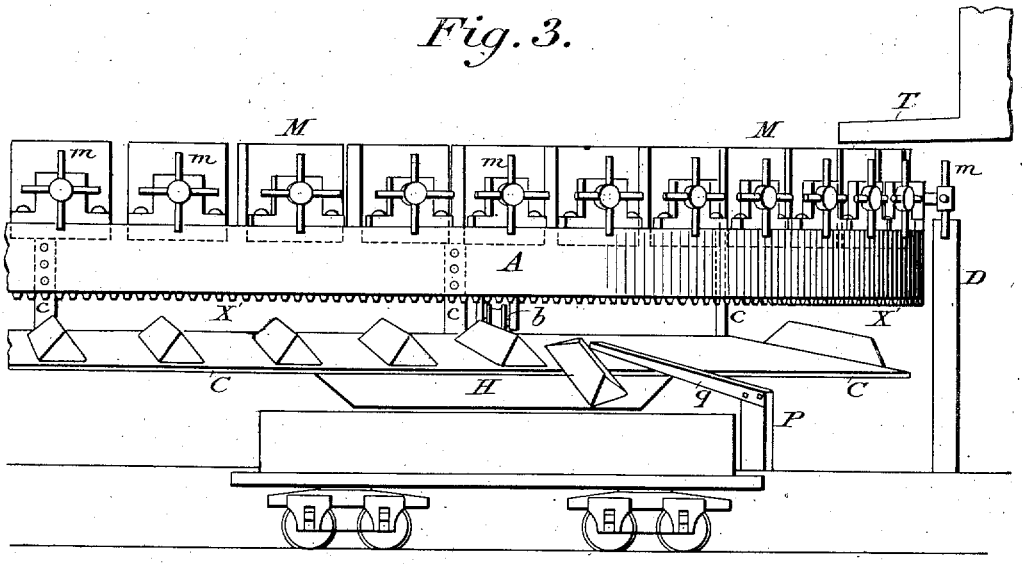

Figure 1 is a top or plan view of the casting apparatus, partly in section, showing our improvements. Fig. 2 is a side elevation of a part of the apparatus, showing the mold-support at the left in section, also showing a part of the suspended platform having some of the ingots deposited thereon, also a spraying-nozzle for cooling them. Fig. 3 is a side elevation of a part of the apparatus opposite that of Fig. 2, showing the manner of overturning the molds for dumping the ingots onto the platform and the manner of brushing the ingots off from said platform and depositing them into a car.

A, in Figs. 1 and 2, is a rotary carrying-wheel composed of a hub $a$, a series of spokes $a'$ united at their outer ends by inner and outer concentric rings $a''$ $a'''$. The hub is supported by a vertical shaft standing on a suitable base or foundation. From the spokes of the carrier depend a series of hangers $b$, having rollers which travel on a circular track or rail $b'$. A suitable motor W, located at one side of the wheel, may be employed for rotating said wheel, having a pinion $x$, which meshes with the rack-teeth $x'$ on the under side of the outer ring of the wheel. M M are a series of rotatable molds, having journals and mounted in bearings provided on the upper sides of the rings $a''$ $a''$. The outer journals of the molds extend outward beyond the ring and are provided with cross-arms $m$ $m$, by means of which the molds are overturned, the said arms contacting with a post D, located at the side of the wheel just in advance of the metal-pouring trough T. This description appertains to the casting apparatus comprised in Patent No. 620,020, and forms no part of our improvement.

Our improvements are described as follows:

C is a circular shelf or platform suspended from the inner ring of the wheel by brackets $c$ $c$, leaving its outer edge unencumbered to allow of freedom for the discharge of the ingots. At one side of the wheel A is provided an inclined table or chute H, onto which the ingots are discharged from the platform C and so disposed that the ingots may slide therefrom and fall into a railway-car standing on a track by the side of the apparatus, and one end of the said inclined table H, having an arm $q$, projecting over the platform C and in the path of the ingots, designed for brushing them off and dropping them onto the incline H.

This apparatus is specially designed for casting metal into pigs or ingots in rapid succession, the revolving of the carrier giving time for the metal to partly cool. When the molds have been carried nearly one complete revolution of the wheel, they are then overturned and the ingots are successively dropped onto the platform. Then they are again carried around, and while making this second round they are further cooled and may be sprayed with water to aid in cooling them. Then they are brushed off the platform onto the incline, as before stated.

What we claim is—

1. The combination of the rotary wheel A, the molds M, M, rotatably mounted thereupon, the ingot receiving and conveying platform C suspended from said wheel A, and underneath the molds, and the post P having arm $q$ projecting over the platform, and in the path of the ingots, substantially as described and for the purpose set forth.

2. In casting apparatus, in combination, a horizontally-arranged rotary mold-carrier, molds thereon for receiving the molten metal to form castings, and a castings-carrier below the mold-carrier arranged to rotate around the axis of the mold-carrier and to support the castings while they are stationary vertically after they have been removed from the molds and while they are rotating around said axis, substantially as set forth.

3. In casting apparatus, in combination, a rotary mold-carrier arranged to rotate on a horizontal axis, the molds mounted on axes on the said carrier and adapted to deliver the castings downward, and a rotary receiver and carrier for the castings below the molds and arranged to rotate around the axis of the mold-carrier, substantially as set forth.

4. In casting apparatus, in combination, the horizontally-arranged rotary mold-carrier, the molds mounted on axes on the said carrier and arranged to deliver downward the castings, the receiver and carrier for the castings below the molds rotating around the axis of the mold-carrier, and means for causing the escape of the castings from the said castings-carrier, substantially as set forth.

5. In casting apparatus, in combination, a horizontally-arranged mold-carrier rotatable around a vertical axis, a series of molds mounted on axes thereon and arranged to deliver downward the castings, the receiver and carrier for the castings below the mold-carrier and adapted to rotate around the vertical axis of the mold-carrier, and power devices adapted to rotate simultaneously both the mold-carrier and the castings-carrier, substantially as set forth.

In witness whereof we, the said DAVID T. CROXTON and SAMUEL W. CROXTON, have hereunto signed our names, in the presence of two witnesses, this 15th day of April, 1902.

DAVID T. CROXTON.
SAMUEL W. CROXTON.

Witnesses:
R. FORWARD, Jr.,
W. B. DAVOCK.